United States Patent [19]
Olson

[11] Patent Number: 5,725,254
[45] Date of Patent: Mar. 10, 1998

[54] FACSIMILE DOCUMENT CARRIER

[75] Inventor: Heidi Olson, Barrington, Ill.

[73] Assignee: Hico Products, Inc., Barrington, Ill.

[21] Appl. No.: 647,722

[22] Filed: May 13, 1996

[51] Int. Cl.⁶ .................................................. B42D 1/00
[52] U.S. Cl. ................................. 283/72; 281/2; 281/5
[58] Field of Search ......................... 281/23.1, 5, 38, 281/51; 283/94, 117, 72

[56] References Cited

U.S. PATENT DOCUMENTS

| | | |
|---|---|---|
| 4,285,531 | 8/1981 | Balsamo .................. 281/2 X |
| 4,660,855 | 4/1987 | Pagliaccio .................. 281/2 |
| 5,087,238 | 2/1992 | Olson. | |
| 5,098,129 | 3/1992 | Haber .................. 281/2 X |
| 5,178,420 | 1/1993 | Shelby .................. 283/94 |
| 5,431,451 | 7/1995 | Bork et al. .................. 283/94 |
| 5,435,601 | 7/1995 | Casari .................. 283/94 |

*Primary Examiner*—Willmon Fridie, Jr.
*Attorney, Agent, or Firm*—McHale & Slavin

[57] ABSTRACT

The instant invention is a carrier of documents for use with facsimile machines. The carrier is particularly effective for odd sized documents and can be reused indefinitely for holding documents as they pass through the scanner of a facsimile machine. The carrier is divided into two portions with an upper portion providing a location for placement of identification indicia and a lower portion providing a document backing. Engagement tabs secure a document to the carrier and are forced while the carrier passes through a facsimile machine. The tabs allow for the reversal of the carrier wherein each side surface includes distinct indicia.

18 Claims, 4 Drawing Sheets

*FIG. 4*

FACSIMILE DOCUMENT CARRIER

FIELD OF THE INVENTION

This invention relates to the transmittal of information through friction roller devices such as facsimile machines, and more particularly, to a document carrier for identifying documents and for carrying of odd sized documents through a facsimile machine.

BACKGROUND OF THE INVENTION

Facsimile machines have become irreplaceable business tools. Facsimile document transfer may even obsolete the need for mailing of documents for a facsimile allows for the instantaneous transmittal through use of public telephone lines. The conventional facsimile machine employs rollers to transfer a document past a scanner where it is encoded for transfer.

A problem occurs when the size of the document to be scanned does not properly pass through the facsimile machine. If the document is odd sized, it may result in an angled reproduction on the receiving end. Should a document twist while inside the facsimile machine, the document may jam and be destroyed. Another problem is the identification of facsimiles. Documents need to be addressed so that the receiving end knows who is to be the recipient.

U.S. Pat. No. 5,087,238, issued to the inventor, is one known prior art device capable of carrying forms or odd size documents through a laser printer or facsimile machine. The carrier is constructed from a rectangular sheet of flexible paper having a fold line dividing the sheet into an upper portion and a lower portion. A document to be transferred through a laser printer is placed on the lower portion of the carrier and held in position by pressure sensitive adhesive placed on the upper portion.

A simple cover sheet is typically used to include pertinent address information. A fax note cover sheet produced by 3M, under part number 7672, is a known prior art device that eliminates the need for a cover sheet. The fax note has adhesive located along the bottom of the note and is attached to the upper portion of a document allowing insertion into a facsimile machine. The adhesive limits reusability and prohibits adaptation to odd-shaped documents as the adhesive would be exposed during transfer.

Additional prior art used to notify the recipient of pertinent information is the Post-It® stick on label by 3M that attaches to a document before insertion through a facsimile machine. The label has provision for notifying the intended recipient and providing a return address. However, the label is fastened to the document requiring care not to conceal an important area. Should the document be small, there may be no alternative than to conceal a portion of the material. In addition, the labeling device does not address the need for carrying documents of an odd size through the facsimile machine.

Thus, what is lacking in the art is a reusable, reversible carrier of documents having identifying indicia and capable of holding odd sized documents during transfer through a facsimile machine.

SUMMARY OF THE INVENTION

The instant invention is a simple and reliable device which overcomes the problems set forth above by provision of a facsimile document carrier capable of securing non-conventional sized items in a proper configuration during transfer through a facsimile machine. In addition, the document carrier includes a provision for placement of a recipient address, a return address, and associated indicia. By placement of the indicia on both side surfaces, the document carrier is not only reusable but reversible.

The document carrier of the instant invention is constructed from a single sheet of rectangular flexible material, preferably 8½"×11" recycled paper. It should be noted that the dimensions are a function of the printing device and the carrier need only meet the minimum recommended dimensions for document scanning. In this manner, european standards such as A-4 paper may be employed. Art upper portion of the carrier includes a location for indicia, such as a forwarding and return address, and is between one and three inches in length. A lower portion of the carrier is separated from the upper portion by a plurality of horizontally disposed tabs for engaging the documents to be carried. The tabs grip a document while passed through a scanner by compression causing holding strength without the need for adhesive. An end of straight tab cut lines can be circular shaped to inhibit tearing beyond the cut line.

The document carrier is inexpensive to manufacture and eliminates the need for a cover sheet. In addition, unlike adhesive based items, the instant invention can be reused for carrying documents through the facsimile machine to the same location. Further, by use of coated material or use of erasable indicia, the document carrier may also be reused indefinitely for carrying documents faxed to any location.

Accordingly, it is an objective of the instant invention to provide an inexpensive carrier device eliminating the need for a cover sheet and maintaining odd sized documents in a fixed position so that the scanning device accepts the carrier, and attached form, as a single sheet of material.

Still another objective of the instant invention is to provide a reusable document carrier with erasable forwarding and return address sections.

Yet still another objective of the instant invention is to disclose the use of die-cut rectangular and triangular tabs (V-shaped) for securing of a document in position.

Another objective of this invention is to provide a document carrier that may be customized by the user through use of a common printer.

Still another objective of the instant invention is to provide a document carrier having non-scannable indicia.

Yet another objective of the instant invention is to disclose the use of a document carrier that is reversible allowing multiple use of the document carrier even if indicia is permanently affixed to one side surface.

Other objects and advantages of this invention will become apparent from the following description taken in conjunction with the accompanying drawing wherein are set forth, by way of illustration and example, certain embodiments of this invention. The drawing constitutes a part of this specification and includes an exemplary embodiment of the present invention.

BRIEF DESCRIPTION OF THE DRAWINGS

FIG. 4 is a front plane view of the document carrier of the instant invention having non scannable indicia.

DETAILED DESCRIPTION OF THE PREFERRED EMBODIMENT

Figure 1:
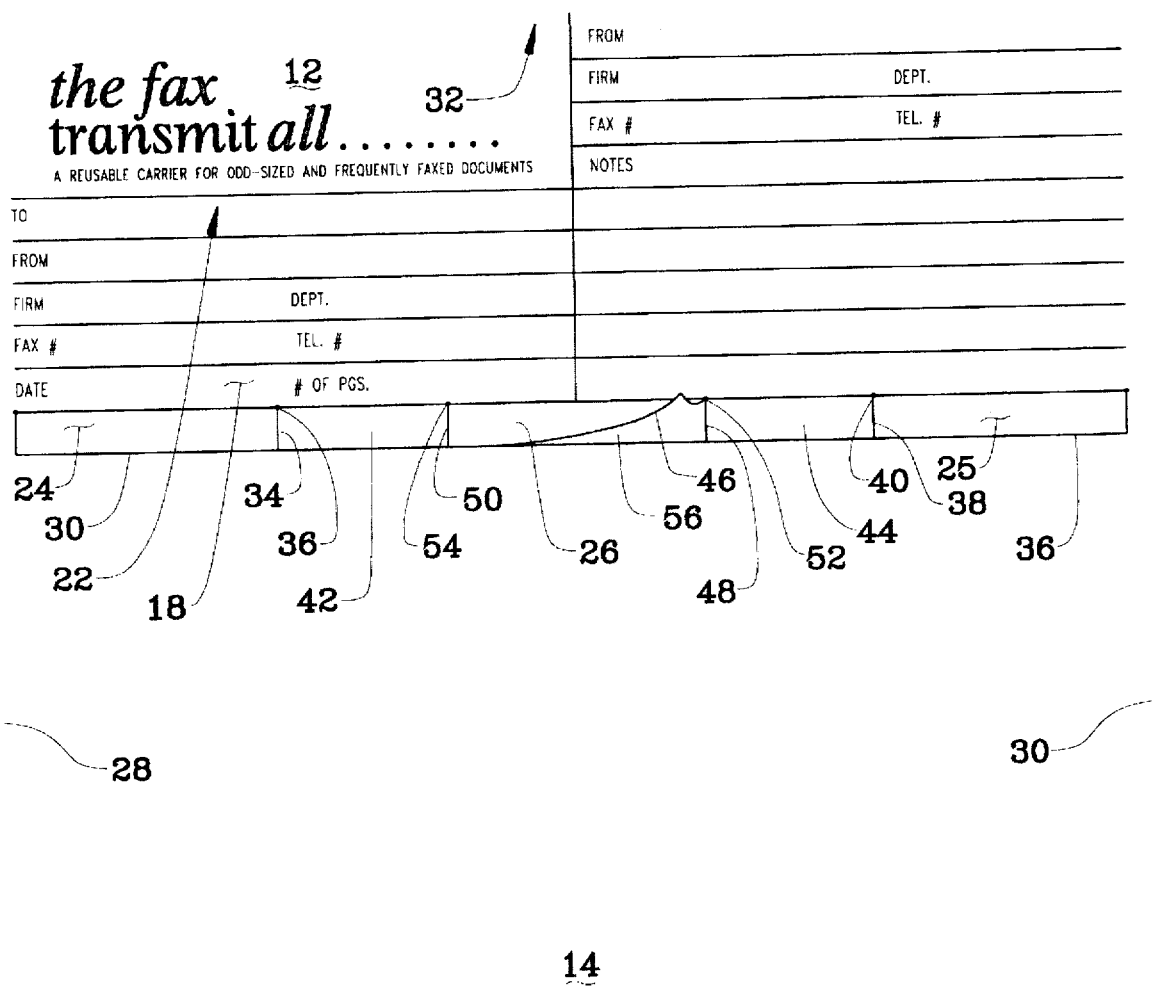
FIG. 1 is a front plane view of the document carrier of the instant invention having rectangular tabs.

Now referring to FIG. 1, shown is a front plane full scale view of the carrier form of the instant invention consisting of a single sheet of flexible material such as 8½"×11" paper, having an upper portion 12 and a lower portion 14 separated by document coupling portion 16. It should be noted that the actual dimensions are a function of the printing device and the carrier need only meet the minimum recommended dimensions for document scanning. In this manner, european standards such as A-4 paper may be employed or smaller sizes may be used for creation of a header. The upper portion 12 includes an area 18 for indicia. This area has preprinted titles regarding pertinent information to indicate who the recipient is, company name, department, fax number, telephone number, date, and number of pages. The upper portion 12 includes a location for stating who the document facsimile is from, company, department, fax number, telephone number, and an area for instructional notes. Changes to the type of indicia are deemed within the scope of this invention.

The Applicant has placed an informational portion 22 in one corner of the upper portion 12 providing a descriptive narrative of the device and trademark. The lower portion 14 of the carrier provides support for a document during transfer, as well as a non-scanning backing plate. The length of the lower portion 14 maintains the document in alignment during the process of transfer.

The coupling portion 16 consists of side edge insertion tabs 24 and 25 positioned along each side edge 28 and 30 of the carrier. Tab 24 is formed from cutting the paper along lower cut line 30 inwardly a first distance parallel to the top edge 32 and inner cut line 34. The die-cut lines allow tab 24 to lift up allowing a document to slide beneath the tab. The end of cut line 32 may optionally include a punch hole 36 to inhibit premature tearing of the carrier should the tab be lifted to the point of stressing the cut line.

Tab 25 is formed from die-cutting the paper along lower cut line 36 inwardly a first distance parallel to the top edge 32 and inner cut line 38. The die-cut lines allow tab 25 to lift up allowing a document to slide beneath the tab. The end of cut line 38 may optionally include a punch hole 40 to prevent premature tearing of the carrier should the tab be lifted to the point of stressing the cut line. The adjoining portion defined by numerals 42 and 44 provides continuity between the upper portion 12 and the lower portion 14 to prevent separation of the portions, the tabs 24 and 25 providing adequate engagement for a majority of document transfers.

The opposite side surface of the sheet may include duplicate or different indicia. In this manner, the document carrier may be reversed providing reusability even if indicia is permanently affixed to one side surface. In addition, by reversing of the document carrier, the bend along the fold line of each tab is reversed which operates to tightly secure a document in position.

It is noted that the carrier of the instant invention can be used to carry any sized document. In this manner, the carrier acts as a reusable information header. The receiving facsimile machine will interpret such a combination as a legal size document. On plain paper facsimile machines, this allows the document to print out on legal size paper or, alternatively, trigger size reduction to reduce the document to print on plain paper facsimile machines having 8½"×11" receiving paper. In addition, smaller documents may make use of center tab 26 formed by an inboard lower cut line 46 extending parallel to said top edge 32 and inner cut lines 48 and 50 extending a second distance from each end of said lower cut line 46 ending in stop holes 52 and 54, respectively. In this manner, tab 26 may operate as a holder for smaller items with its centrally located position or operate in conjunction with tabs 24 and 25 if additional document holding strength is required. By way of illustration, the back surface 56 can be seen which lays over a portion of the surface to be carried.

Figure 2:
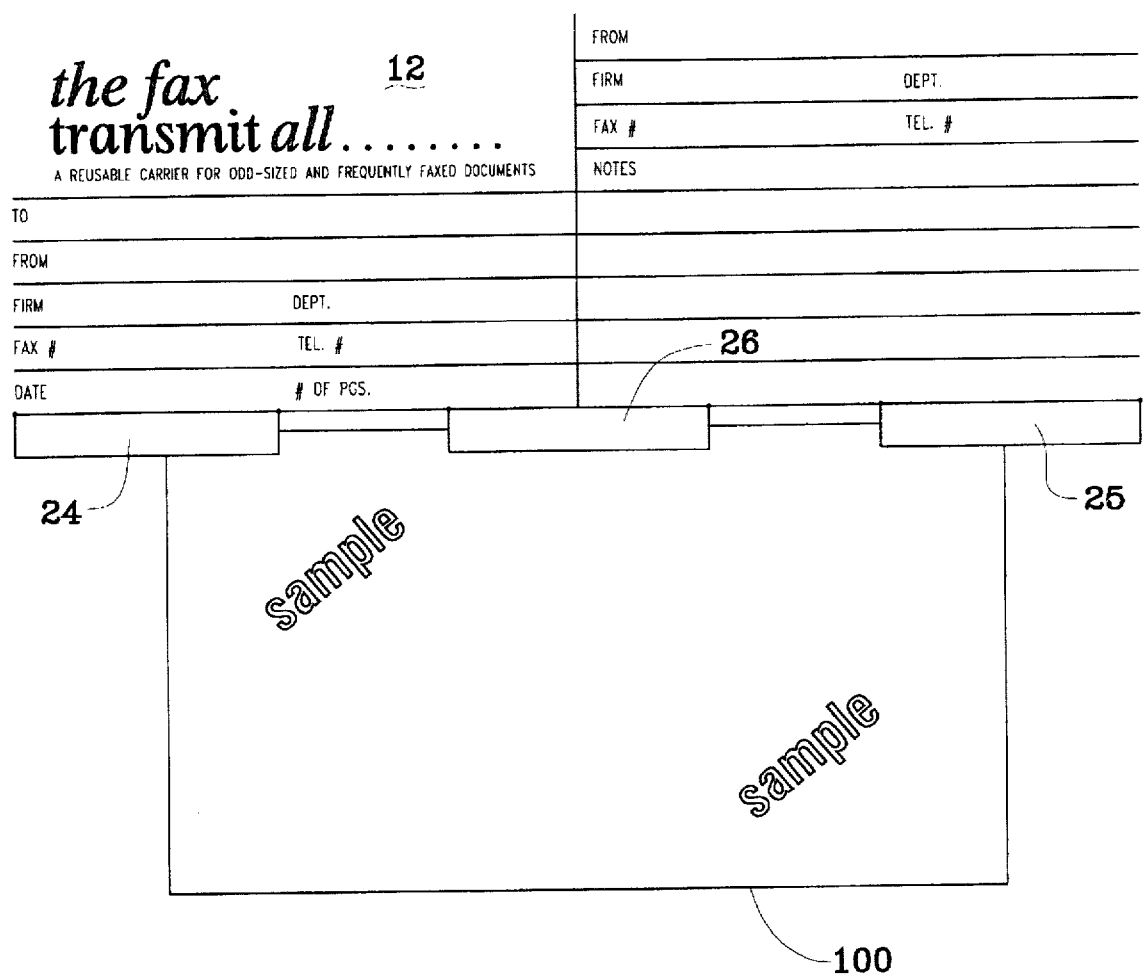
FIG. 2 is a front plane view of the document carrier with example of an odd sized document attached.

Referring to FIG. 2, set forth is an example of the carrier holding a postal return mail receipt 100 as an illustration of an odd sized document. In this manner, the mail receipt 100 is placed beneath side edge insertion tabs 24 and 25 and centrally disposed insertion tab 26. The cut lines allow the tabs to lift up permitting the document 100 to slide beneath each tab.

The upper portion 12 is filled in with information to indicate who the recipient is and who the document is forwarded from. The carrier is then inserted into a facsimile machine for scanning, the document held in position by the tabs during the scanning process. The tabs are forced against the document during the scanning process to further assist holding of the document. Adhesive could be either beneath the tabs or on the surface of the backing sheet. Although adhesive is not necessary for proper securement, it is deemed within the scope of this invention.

Figure 3:
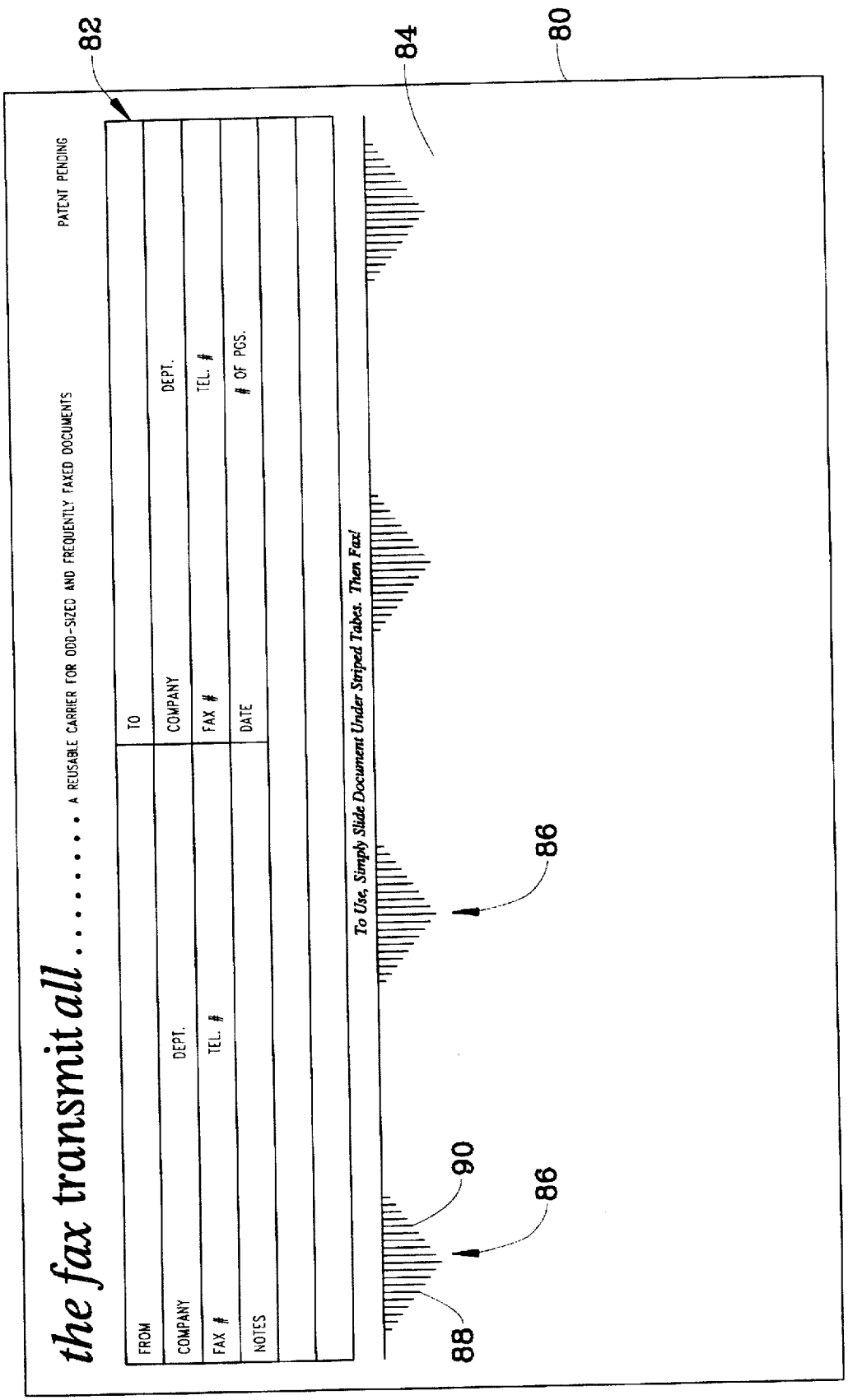
FIG. 3 is a front plane view of the preferred document carrier of the instant invention having triangular tabs.

Now referring to FIG. 3, shown is a preferred embodiment of the instant invention consisting of a facsimile sheet having an 8½" width and a length of approximately 5½". In this embodiment, the document carrier 80 has an upper portion 82 and a lower portion 84 with a plurality of tabs 86 for securement of documents in a manner previously described. The upper portion 82 includes recipient and addressee information shown in a revised format illustrating that the altering of fixed indicia is deemed within the scope of this invention. It should be noted that a company's letterhead may be placed in this location with provisions for placement of recipient information.

The lower portion 84 continues to operate as a backing sheet with the primary difference in the embodiment being tabs 86 which are V-shaped and with the coupling fold line appear triangular shaped having cut-line 88 and 90 placed at an angle to lessen the need for punch holes. The angular cut lines are less likely to tear and by use of smaller tabs, allow for multiplicity providing the required holding power. In addition, it is noted that the V-shaped tabs provide an increase in holding ability as documents placed beneath the tab may slip out if a cut-line is made parallel to a side edge, whereas an angular cut-line provides frictional engagement along a broader area of the document to be held versus a singular section of the document.

Figure 4:
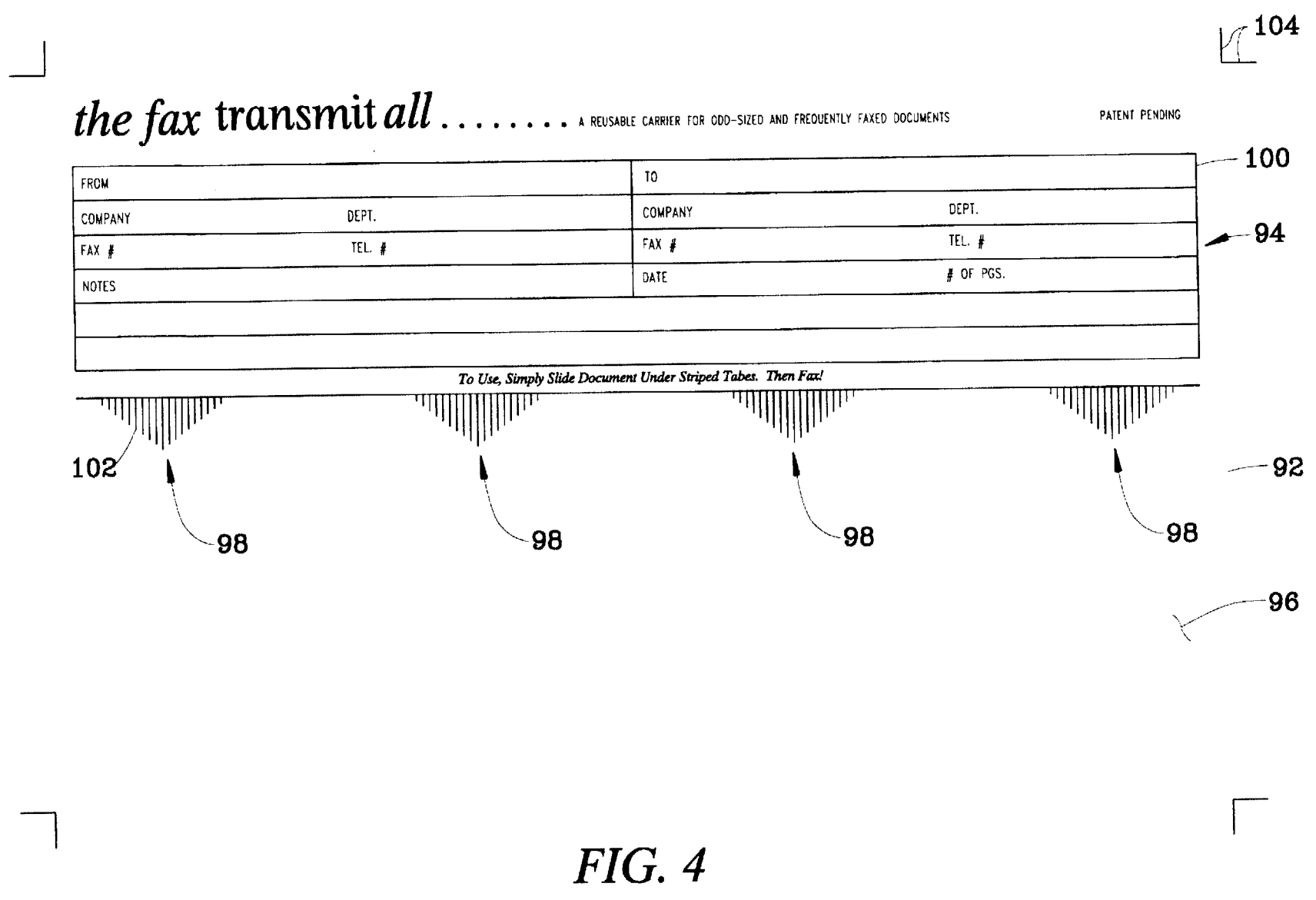

FIG. 4. is an alternative embodiment of the preferred invention consisting of a facsimile header. In this embodiment, the document carrier 92 has an upper portion 94 and a lower portion 96 with a plurality of tabs 98 for securement of documents in a manner previously described. This embodiment employs indicia that does not scan through a facsimile machine but does provide a visual indicator of tab and block printing to facilitate usage. Thus, the upper portion 94 includes recipient and addressee information with non-scanning pattern lines 100 used in outlining and dividing of each informational section. Similarly, tabs 98 include pattern lines 102 to highlight tab location. Boarder lines 104 indicate the edge of the forms carrier for purposes of drawing submittal only. The actual edge of the carrier does not scan.

The carrier of the instant invention may be made from flexible materials other than paper such as a thin sheet of plastic to allow infinite reuse. In addition, the type of material chosen may allow for changing of the indicia by simply removing the previous indicia before reuse. Further, as previously mentioned, the carrier may be reversed allowing the placement of indicia on an opposite side providing multiple usage of the device.

The document carrier of the instant invention may also be a plain sheet of paper with the insertion tabs precut. In this manner the document carrier may be run through any type of printer wherein personalized or customized indicia may be along the upper portion. This would allow the consumer to use their own word processor to edit the indicia section. In addition, the incorporation of graphic indicia is made possible by the use of most computer based personal computers.

It is to be understood that while certain forms of the invention are illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A document carrier for facsimile machines, said carrier comprising:

a single sheet of flexible two surface material having a top and bottom edge defining a length therebetween and two side edges defining a width; indicia means on a first side surface of said sheet; and a tab means for securing a document to a lower portion of said sheet, said tab means is formed from at least one cut-line extending from said bottom edge inwardly a predetermined distance; wherein said sheet is insertable into a facsimile machine with said tab means maintaining a document in position during facsimile scanning.

2. The document carrier according to claim 1 wherein said indicia means includes preprinted recipient and addressor indicia positioned along an upper portion of a first side surface.

3. The document carrier according to claim 1 wherein said indicia means includes preprinted recipient and addressor identification indicia positioned along an upper portion of a second side surface.

4. The document carrier according to claim 1 wherein a portion of said indicia is formed from print that is not detectable by a facsimile scanner.

5. A document carrier for facsimile machines, said carrier comprising: a single sheet of flexible material having a top edge and a bottom edge defining a length therebetween and two side edges defining a width, an upper portion of at least one side surface including preprinted recipient and addressor identification indicia;

tab means for securing a document to a lower portion of said sheet, said tab means formed from at least one cut-line extending from said bottom edge inwardly a predetermined distance;

wherein said sheet is insertable into a facsimile machine with said tab means maintaining said document in proper position during facsimile scanning with said upper portion providing identification indicia to the recipient of the facsimile.

6. The document carrier according to claim 5 wherein said tabs are further defined as insertion tabs positioned along each side edge of said sheet, said insertion tabs formed from a lower die-cut line extending from each side edge inwardly a first distance and parallel to said top edge and an inner die-cut line extending a second distance upwardly from each lower cut line, said insertion tabs allow securing a document upon placement of an edge of each document beneath said insertion tabs.

7. The document carrier according to claim 6 wherein said inner cut line of each said side edge insertion tab terminates in a circular punch hole to inhibit extension of said cut lines.

8. The document carrier according to claim 5 wherein one said insertion tab is a centrally disposed insertion tab formed from an inboard lower die-cut line extending parallel to said top edge a predetermined distance with an upwardly facing die-cut line extending a second distance from each end of said lower cut line, said insertion tab allowing for securement of a document upon placement of an edge of the document beneath said insertion tab.

9. The document carrier according to claim 8 wherein each said inner cut line of said centrally disposed insertion tab terminates in a circular punch hole to inhibit extension of said cut lines.

10. The document carrier according to claim 5 wherein said sheet material is paper.

11. The document carrier according to claim 5 wherein said tab means is further defined as a plurality of V-shaped insertion tabs.

12. The document carrier according to claim 11 wherein each said insertion tab is formed from a first and second angular lower die-cut line extending upwardly from a point in the lower portion a first distance and ending in a plane parallel to said top edge, said insertion tabs allow securing a document upon placement of an edge of each document beneath said insertion tabs.

13. The document carrier according to claim 5 including indicia placed on a second surface of said sheet making said document carrier reversible.

14. The document carrier according to claim 5 wherein a portion of said indicia is formed from print that is not detectable by a facsimile scanner.

15. A document carrier for facsimile machines, said carrier comprising:

a single sheet of flexible material having a top and bottom edge defining a length therebetween and two side edges defining a width, an upper portion of a first side surface of said sheet available for placement of recipient and addressor identification indicia;

at least two insertion tabs extending upwardly from said lower portion and ending in a fold line parallel to said top edge, wherein said sheet is insertable into a facsimile machine with said lower portion acting as a backing sheet to maintain said document in proper position during facsimile scanning.

16. The document carrier according to claim 15 wherein said insertion tabs are V-shaped.

17. The document carrier according to claim 15 wherein said insertion tabs are rectangularly shaped.

18. The document carrier according to claim 14 including a means for placement of indicia on said sheet.

* * * * *